(12) United States Patent
Pecak et al.

(10) Patent No.: US 11,592,108 B2
(45) Date of Patent: Feb. 28, 2023

(54) SEAL HAVING A LIP OPTIMIZED FOR LOW TEMPERATURE APPLICATIONS

(71) Applicant: AKTIEBOLAGET SKF, Gothenburg (SE)

(72) Inventors: Robert D. Pecak, Naperville, IL (US); Daniel J. Levy, Arlington Heights, IL (US); Timothy Patterson, Hanover Park, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 143 days.

(21) Appl. No.: 16/927,057

(22) Filed: Jul. 13, 2020

(65) Prior Publication Data

US 2021/0088143 A1 Mar. 25, 2021

Related U.S. Application Data

(60) Provisional application No. 62/902,767, filed on Sep. 19, 2019.

(51) Int. Cl.
*F16J 15/3236* (2016.01)
*F16D 48/02* (2006.01)

(52) U.S. Cl.
CPC ... *F16J 15/3236* (2013.01); *F16D 2048/0212* (2013.01)

(58) Field of Classification Search
CPC ............... F16J 15/3232; F16J 15/3236; F16D 2048/0212
See application file for complete search history.

(56) References Cited

U.S. PATENT DOCUMENTS

| | | | | |
|---|---|---|---|---|
| 2,806,725 A | * | 9/1957 | Kosatka | F16J 15/3284 277/575 |
| 3,903,584 A | * | 9/1975 | Evans | B23P 13/00 29/450 |
| 4,410,189 A | * | 10/1983 | Myers | F16J 15/3208 277/553 |

(Continued)

FOREIGN PATENT DOCUMENTS

| | | | | | |
|---|---|---|---|---|---|
| JP | 09210088 A | * | 8/1997 | ........... | F16J 15/3236 |
| JP | 10331983 A | * | 12/1998 | ........... | F16J 15/3236 |
| JP | 2008106902 A | * | 5/2008 | ......... | F16D 25/0638 |

*Primary Examiner* — Eugene G Byrd
(74) *Attorney, Agent, or Firm* — J-Tek Law PLLC; Scott T. Wakeman; Mark A. Ussai

(57) ABSTRACT

A seal includes an annular seal body formed of an elastomeric material and has opposing first and second circumferential surfaces and a sealing projection extending radially from the first circumferential surface. The projection has a frustoconical primary sealing surface with first and second axial ends and an axial length between the first and second ends. The projection is sealingly engageable with the inner surface of the outer member when the seal body is coupled with the inner member, such that substantially the entire axial length of the primary sealing surface is disposed against the inner surface of the outer member. Alternatively, the projection is sealingly engageable with the outer surface of the inner member when the seal body is coupled with the outer member, such that substantially the entire axial length of the primary sealing surface is disposed against the outer surface of the inner member.

16 Claims, 5 Drawing Sheets

(56) References Cited

U.S. PATENT DOCUMENTS

| | | | | |
|---|---|---|---|---|
| 5,865,442 A * | 2/1999 | Iwashita | ............... | F16J 15/3252 |
| | | | | 277/560 |
| 6,056,293 A * | 5/2000 | Visconti | ............... | F16J 15/3232 |
| | | | | 277/560 |
| 6,547,250 B1 * | 4/2003 | Noble | .................... | F16J 15/164 |
| | | | | 277/471 |
| 6,575,471 B1 * | 6/2003 | Grosspietsch | ........ | F16J 15/3236 |
| | | | | 277/436 |
| 6,676,132 B1 * | 1/2004 | Takebayashi | ........... | F16J 15/324 |
| | | | | 277/560 |
| 9,194,496 B2 * | 11/2015 | Pecak | ..................... | F16D 25/06 |
| 9,482,292 B2 * | 11/2016 | Ozawa | ................. | F16J 15/3232 |
| 10,100,931 B2 * | 10/2018 | Pecak | ..................... | F16J 15/164 |
| 10,119,573 B2 * | 11/2018 | Arnault | ................... | F16C 41/00 |
| 11,111,969 B2 * | 9/2021 | Arnault | ................... | F16C 19/16 |
| 2004/0150168 A1 * | 8/2004 | Heathcott | ............ | F16J 15/3236 |
| | | | | 277/500 |
| 2005/0284724 A1 * | 12/2005 | Hagenow | ................ | F16D 25/12 |
| | | | | 192/85.41 |
| 2007/0251380 A1 * | 11/2007 | Kanzaki | .............. | F16D 25/0638 |
| | | | | 92/240 |
| 2009/0032366 A1 * | 2/2009 | Goto | ........................ | F16D 25/12 |
| | | | | 192/85.44 |
| 2009/0282972 A1 * | 11/2009 | Schmidt | ............... | F16J 15/3236 |
| | | | | 92/248 |
| 2010/0025937 A1 * | 2/2010 | Morishita | ................ | F16D 25/12 |
| | | | | 277/549 |
| 2010/0200355 A1 * | 8/2010 | Nishimura | .......... | F16D 25/0638 |
| | | | | 192/85.44 |
| 2013/0285333 A1 * | 10/2013 | Foti | ......................... | D06F 37/00 |
| | | | | 277/562 |
| 2016/0010750 A1 * | 1/2016 | Colineau | .............. | F16J 15/3232 |
| | | | | 277/575 |

* cited by examiner

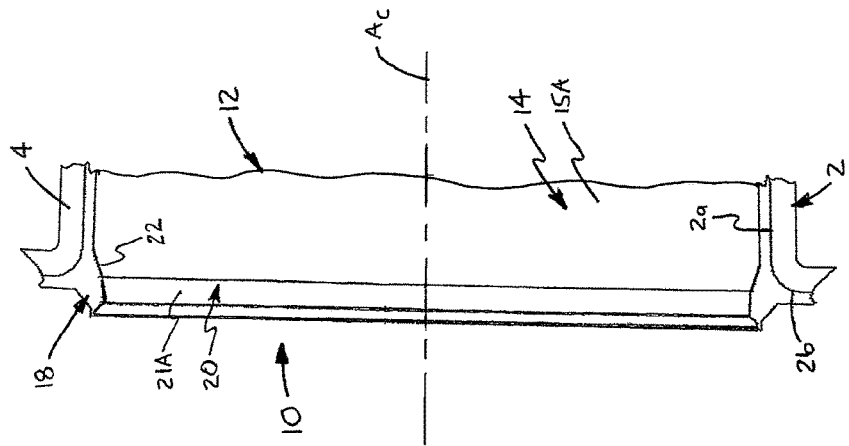
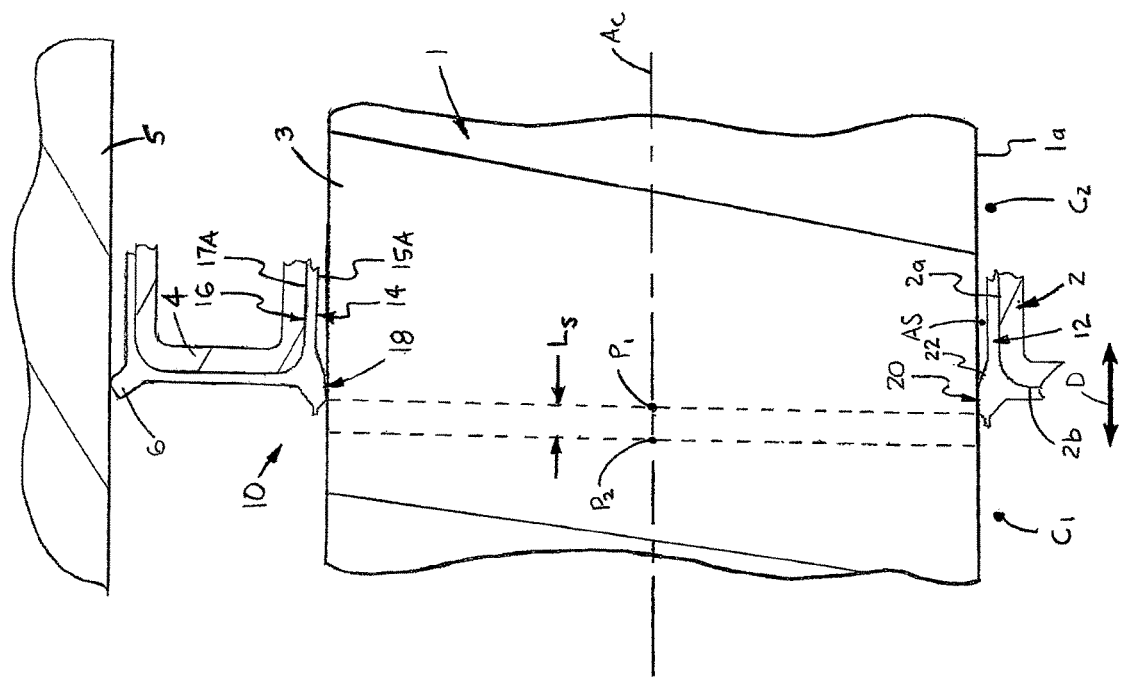
FIG. 1
FIG. 2

SEAL HAVING A LIP OPTIMIZED FOR LOW TEMPERATURE APPLICATIONS

CROSS REFERENCE

This application claims the benefit of U.S. Provisional Application No. 62/902,767, filed Sep. 19, 2019.

BACKGROUND OF THE INVENTION

The present invention relates to seals, and more particularly to lip seals operational at least partially at relatively low temperatures.

A conventional lip seal includes an annular elastomeric body with a generally semicircular lip that engages inwardly against a shaft or outwardly against a bore surface. During initial start-up of a machine incorporating the seal, the seal may experience inflexibility when the initial temperature is below the glass transition temperature of the particular elastomer. As such, the seal lip may permit leakage past the seal until the temperature increases above the glass transition temperature.

SUMMARY OF THE INVENTION

In one aspect, the present invention is a seal for sealing an annular space between an inner member and an outer member, the inner member having an outer circumferential surface and the outer member having an inner circumferential surface. The annular space is defined between the inner and outer circumferential surfaces and one of the inner and outer members is displaceable through a stroke length along a central axis. The seal comprises an annular seal body formed of an elastomeric material, coupled with the inner member or with the outer member, and having a first circumferential surface, an opposing second circumferential surface, and a sealing projection extending radially from the first circumferential surface, the projection having a generally frustoconical primary sealing surface with a first axial end, a second axial end and an axial length between the first and second ends. Further, the projection is sealingly engageable with the inner surface of the outer member when the seal body is coupled with the inner member, such that substantially the entire axial length of the primary sealing surface is disposed against the inner surface of the outer member. Alternatively, the projection is sealingly engageable with the outer surface of the inner member when the seal body is coupled with the outer member, such that substantially the entire axial length of the primary sealing surface is disposed against the outer surface of the inner member.

In another aspect, the present invention is again a seal for sealing an annular space between an inner member and an outer member, the inner member having an outer circumferential surface and the outer member having an inner circumferential surface and an axial end. The annular space is defined between the inner and outer circumferential surfaces and one of the inner and outer members is linearly displaceable through a stroke length along a central axis. The seal comprises an annular seal body formed of an elastomeric material and having an inner circumferential surface and an opposing outer circumferential surface, the outer circumferential surface being disposed on the inner surface of the outer member, and a generally cantilever-like sealing projection extending radially inwardly from the inner circumferential surface and axially beyond the axial end of the outer member. The projection has a generally frustoconical primary sealing surface having a first axial end, a second axial end and an axial length between the first and second ends. The projection is sealingly engageable with the outer surface of the inner member such that substantially the entire axial length of the primary sealing surface is disposed against the outer circumferential surface of the inner member.

In yet another aspect, the present invention is again a seal for sealing an annular space between an inner member and an outer member, the inner member having an outer circumferential surface and an axial end and the outer member having an inner circumferential surface. The annular space is defined between the inner and outer circumferential surfaces and one of the inner and outer members is linearly displaceable through a stroke length along a central axis. The seal comprises an annular seal body formed of an elastomeric material and having an inner circumferential surface and an opposing outer circumferential surface, the inner circumferential surface being disposed on the outer surface of the inner member, and a generally cantilever-like sealing projection extending radially outwardly from the outer circumferential surface of the seal body and axially beyond the axial end of the inner member. The projection has a generally frustoconical primary sealing surface having a first axial end, a second axial end and an axial length between the first and second ends. The projection is sealingly engageable with the inner surface of the outer member such that substantially the entire axial length of the primary sealing surface is disposed against the inner circumferential surface of the outer member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 1 is an axial cross-sectional view of a seal in accordance with the present invention, shown in an inwardly sealing configuration installed upon an outer member and sealing against an inner member;

FIG. 2 is an axial cross-sectional view of the seal of FIG. 1, shown in an uninstalled or "free" state;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 4:
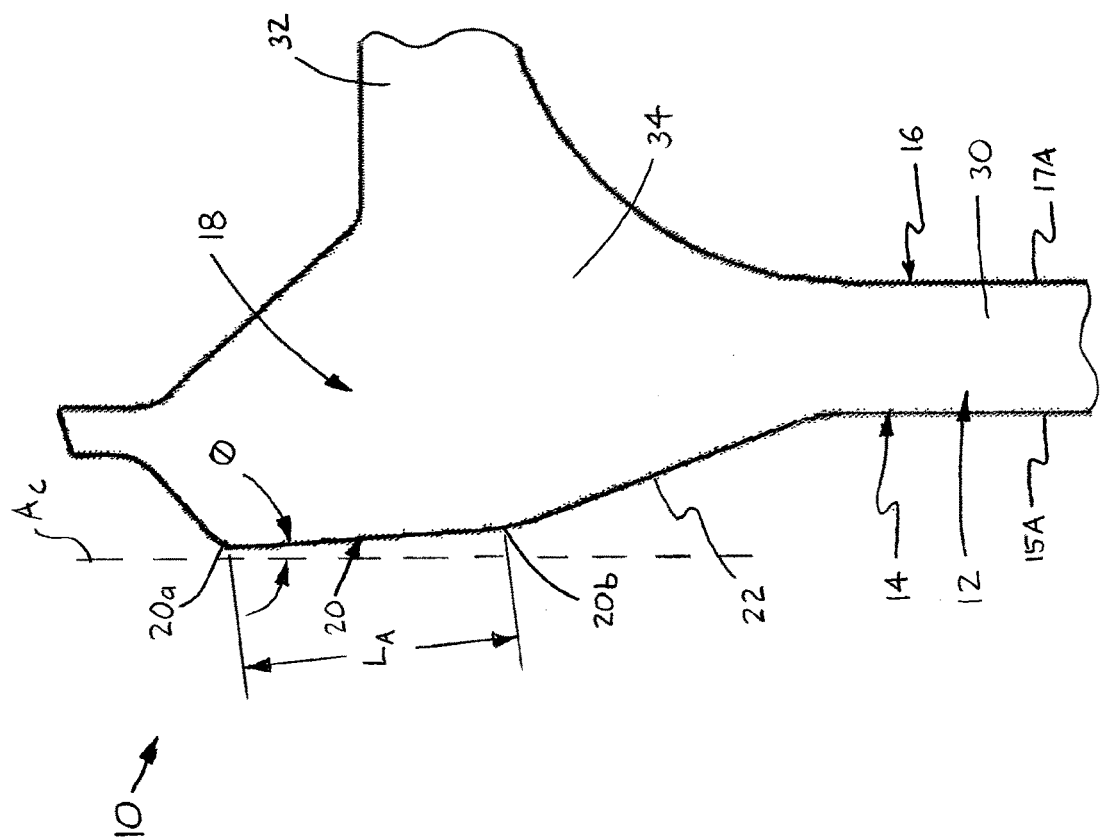
FIG. 4 is a more enlarged, broken-away view of a portion of FIG. 3.
Figure 5:
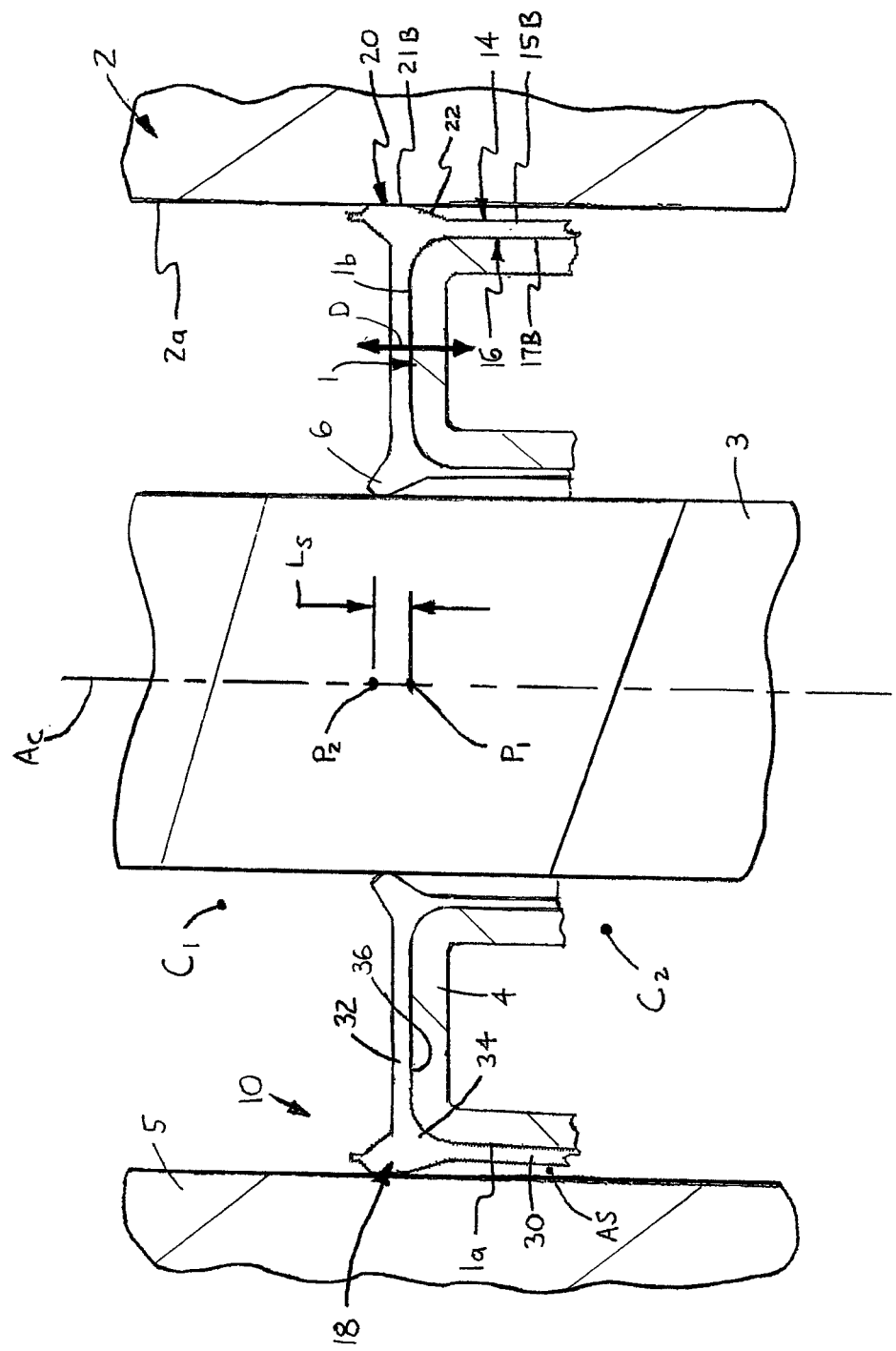
FIG. 5 is an axial cross-sectional view of a seal in accordance with the present invention, shown in an outwardly sealing configuration installed upon an inner member and sealing against an outer member.

Referring now to the drawings in detail, wherein like numbers are used to indicate like elements throughout, there is shown in FIGS. 1-7 a seal 10 for sealing an annular space AS between an inner member 1 and an outer member 2 so as to prevent fluid flow between a first chamber $C_1$ containing a first fluid (e.g., oil) and a second chamber $C_2$ containing a second fluid (e.g., air). As used herein, the terms "inner member" and "outer member" are used to indicate the relative positioning of any two members between which sealing of an annular space is desired, such that an outer member may be disposed within a third member or/and the inner member may be disposed about a different third member. For example, the inner member 1 may be a shaft 3 and the outer member 2 may be a central piston 4 disposed about the shaft 3 and within a housing/drum 5, as shown in FIG. 1, or the inner member 1 may be the central piston 4 and the outer member 2 may be the housing/drum 5, as depicted in FIG. 5, or any other appropriate combinations of inner and outer members 1, 2, respectively, requiring sealing.

In any case, the inner member 1 has an outer circumferential surface 1a and the outer member 2 has an inner circumferential surface 2a, the annular space AS being defined between the inner and outer circumferential surfaces 1a, 2a, respectively. As best shown in FIGS. 1 and 5, one of the inner and outer members 1, 2, respectively, is at least linearly displaceable D through a stroke length $L_S$ along a central axis $A_C$, i.e., between first and second positions $P_1$ and $P_2$, respectively, and may also be angularly displaceable about the axis $A_C$ (i.e., may also turn or rotate about the axis $A_C$ during linear displacement).

The seal 10 comprises an annular seal body 12, which is formed of an elastomeric material and has a first circumferential surface 14 and an opposing second circumferential surface 16, and a sealing projection 18. Preferably, the second circumferential surface 16 of the seal body 12 is either disposed on the inner surface 2a of the outer member 2 or disposed on the outer surface 1a of the inner member 1 so as to couple the seal 10 with the particular member 1 or 2. Alternatively, the seal body 12 may be disposed within an annular groove (not shown) of either member 1, 2. Further, the seal 10 may be coupled with the movable one of the members 1, 2 or coupled with the other, non-movable or "static" member 2, 1, respectively.

Also, when used in an application having a central member, such as the piston 4, the present seal 10 is preferably used in pairs in which one seal 10 seals inwardly against the shaft 3 and the other seal 10 seals outwardly against the housing 5 (structure not shown). However, to simplify the description of the details of the seal 10, the inwardly sealing and outwardly sealing versions of the seal 10 are described separately and each shown in combination with a standard seal 6 in FIGS. 1 and 5.

Figure 3:
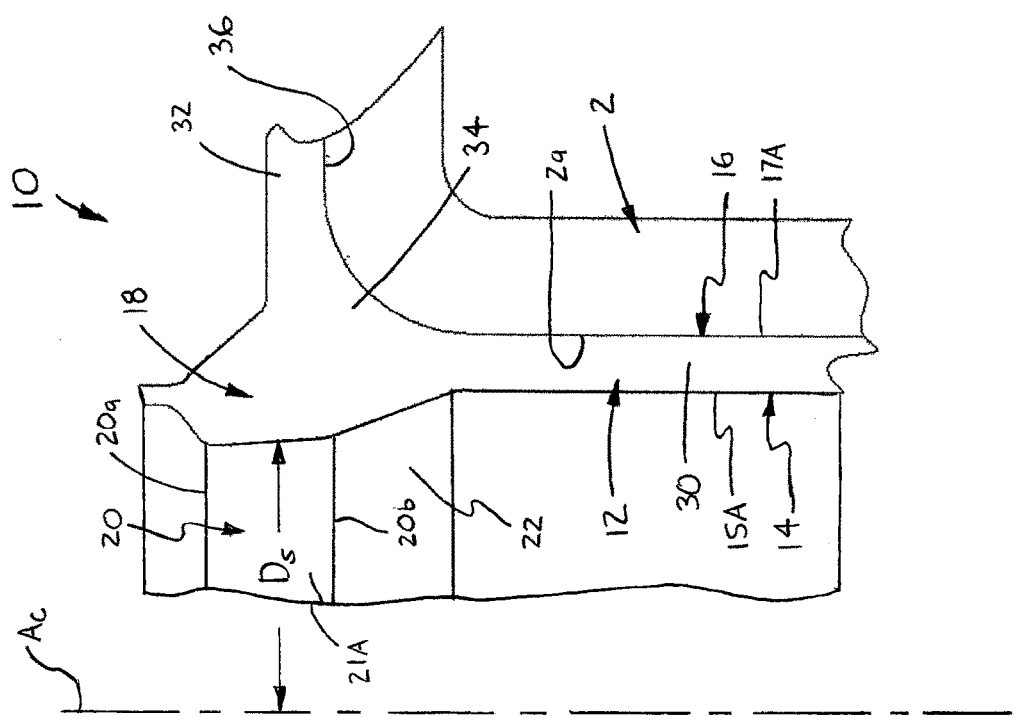
FIG. 3 is an enlarged, broken-away view of a portion of FIG. 2.

Further, the sealing projection 18 extends radially from the first circumferential surface 14 and has a generally frustoconical primary sealing surface 20. Preferably, the sealing projection 18 is generally cantilever-like and extends axially beyond an axial end 1b or 2b of the particular member 1, 2, respectively, to which the seal body 12 is coupled. That is, axially beyond the axial end 2b when coupled with the outer member 2, as shown in FIG. 1, or axially beyond an axial end 1b when coupled with the inner member 1, as depicted in FIG. 5. Further, the primary sealing surface 20 has a first axial end 20a, a second axial end 20b and an axial length $L_A$ between the first and second ends 20a, 20b, as indicated in FIGS. 3 and 4.

The projection 18 is sealingly engaged with the outer surface 1a of the inner member 1 when the seal body 12 is coupled with the outer member 2, as shown in FIG. 1, such that substantially the entire axial length $L_A$ of the primary sealing surface 20 is disposed against the inner member outer surface 1a. Alternatively, the projection 18 is sealingly engaged with the inner surface 2a of the outer member 2 when the body 12 is coupled with the inner member 1, as depicted in FIG. 5, such that substantially the entire axial length $L_A$ of the primary sealing surface 20 is disposed against the outer member inner surface 2a.

In either case, the axial length $L_A$ of the primary sealing surface 20 has a value of at least a value of the stroke length $L_S$ of the movable member 1 or 2, i.e., $L_A$ is equal to or greater than the length $L_S$. As such, no section of the surface 1a or 2a against which the projection 18 seals is ever located in both chambers $C_1$ and $C_2$ during displacement of the movable member 1 or 2. In other words, any section of the engaged surface 1a or 2a will always be located in the first chamber $C_1$, always located in the second chamber $C_2$, located in the first chamber $C_1$ for part of the "stroke" and otherwise engaged by the sealing projection 18, located in the second chamber $C_2$ for part of the "stroke" and otherwise engaged by the sealing projection 18, or always engaged by the projection 18. Thus, any fluid, such as oil, which may become disposed within an imperfection, e.g., a void, cavity, etc., in the surface 1a or 2a being sealed against is prevented from "leaking" past the seal 10.

The structure of the present seal 10 is particularly beneficial for low temperature applications, specifically operating in ambient temperatures below the glass-transition temperature of the particular elastomer of the seal body 12, which is most often experienced at the initial "start-up" of a machine incorporating the two members 1 and 2. More specifically, the glass transition temperature is the temperature below which the seal material has become brittle and inflexible. As such, seal material at or below the glass-transition temperature is unable to expand and fill such surface imperfections or to fill a void/space between the seal 10 and the surface 1a or 2a being sealed against caused by relative misalignment or "cocking" of the members 1, 2. Therefore, having the sealing surface 20 with an axial length $L_A$ equal to or greater than the stroke length $L_S$ will ensure that no leakage of fluid through the seal 10 occurs even when the seal material is below the glass transition temperature.

With previously known seals having a conventional semicircular profile, the seal "band", i.e., the axial length of the contact surface of a seal with a surface is generally too narrow and enables surface imperfections to be exposed to both chambers $C_1$ and $C_2$. In order to increase the seal band, certain prior art seals have operated with increased radial loading to cause greater interference, which also substantially increases friction between the seal and the surface, particularly when the temperature of a machine increases during operation.

Referring to FIGS. 1-4, the seal 10 may formed to be "inwardly sealing", such that the seal body 12 is disposed on the outer member 2, the first circumferential surface 14 is an inner circumferential surface 15A, the second circumferential surface 16 is an outer circumferential surface 17A and the sealing projection 18 extends radially inwardly from the inner circumferential surface 15A. The frustoconical sealing surface 20 is an inner circumferential sealing surface 21A and sealingly engages with the outer circumferential surface 1a of the inner member 1. Alternatively, as shown in FIG. 5, the seal 10 may formed to be "outwardly sealing", such that the seal body 12 is disposed on the inner member 1, the first circumferential surface 14 is an outer circumferential surface 15B, the second circumferential surface 16 is an inner circumferential surface 17B and the sealing projection 18 extends radially outwardly from the outer circumferential surface 15B. The frustoconical sealing surface 20 is an outer circumferential sealing surface 21B and sealingly engages with the inner circumferential surface 2a of the outer member 2.

Referring specifically to FIG. 4, the generally frustoconical sealing surface 20 defines an angle θ with the central axis $A_C$, or with a line parallel to the central axis $A_C$, when the seal 10 is nonengaged with the inner member 1 or nonengaged with the outer member 2. In other words, when the seal 10 is in a "free state" and not compressed by engagement with one of the two members 1 or 2. The angle θ is substantially "shallow" and has a value of less than seven and one-half degrees (7.5°), and preferably less than five degrees (5°). The shallow angle θ in the free state facilitates assembly of the seal 10 into engagement with the inner member outer surface 1a or the outer member inner surface 2a, but is not present when the seal 10 is installed as at least substantially the entire sealing surface 20 is engaged with the outer surface 1a or the inner surface 2a.

Further, the primary sealing surface 20 is preferably substantially "flat", although frustoconical or axially tapered in the free or uninstalled state. Specifically, the primary sealing surface 20 has a diameter Ds (FIG. 3) about the central axis $A_C$, that varies at least substantially linearly between the first axial end 20a of the sealing surface 20 and the second axial end 20b of the sealing surface 20, such that the sealing surface 20 appears substantially linear in any axial cross-section of the seal 10. Such "flatness" ensures engagement of the entire sealing surface 20 when the seal 10 is installed and operational.

Referring again to FIGS. 1-7, the sealing projection 18 has a secondary sealing surface 22 extending radially and axially between the first circumferential surface 14 and the primary sealing surface 20. Due to the structure of the seal body 12 and the projection 18, a portion of the secondary sealing surface 22 is disposed against either the inner member outer surface 1a, or the outer member inner surface 2a, when the annular space AS has a radial length $L_R$ that is less than a predetermined value $V_P$ (FIG. 7). Thus, the structure of the seal projection 18 enables the seal 10 to function as intended over a greater range of dimensional tolerances of the seal 10 without a substantial variation in friction between the seal 10 and the engaged surface 1a or 2a.

Figure 6:
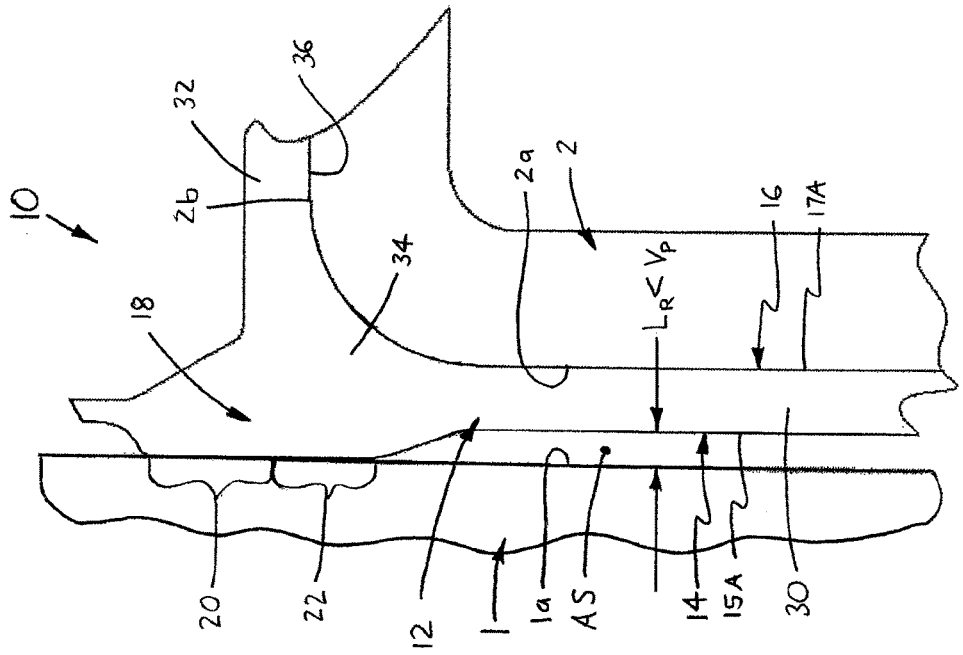
FIG. 6 is an enlarged, broken-away view of a portion of the seal of FIG. 1, show a seal formed at a lower end of a tolerance range.
Figure 7:
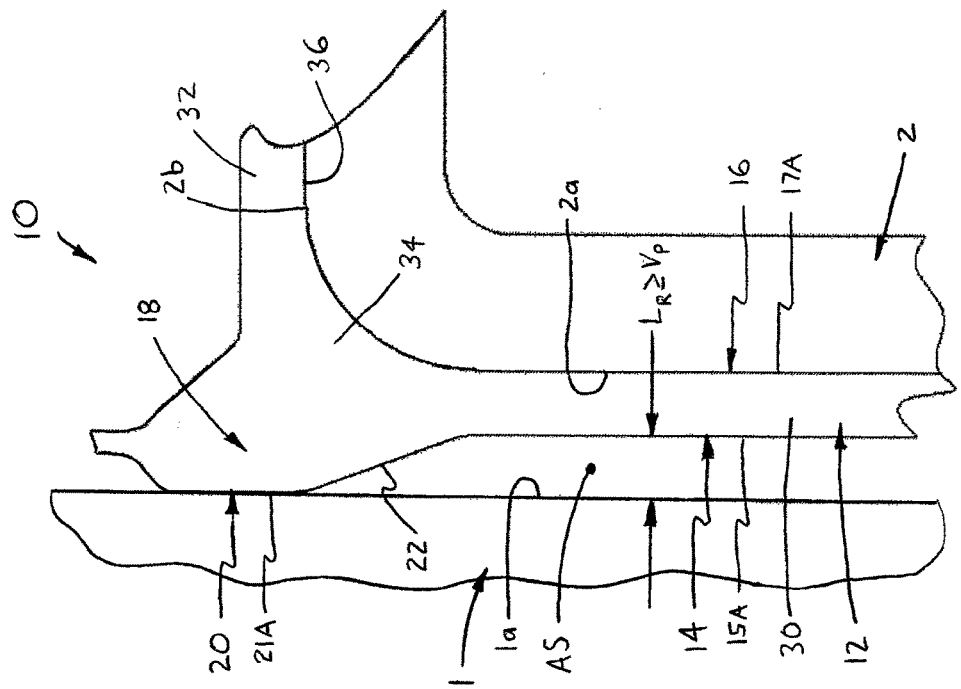
FIG. 7 is an enlarged, broken-away view of a portion of the seal of FIG. 1, showing a seal formed at a higher end of a tolerance range.

In other words, when the seal 10 is formed to be inwardly sealing, a seal 10 formed on the diametrically greater end of the tolerance range will engage the inner member 1 with only the primary sealing surface 20, as shown in FIG. 6, whereas a seal 10 formed on the diametrically lesser end of the tolerance range will engage the inner member 1 with both the primary sealing surface 20 and a portion of the secondary sealing surface 22, as depicted in FIG. 7. Similarly, when the seal 10 is formed to be outwardly sealing, a seal 10 formed on the diametrically lesser end of the tolerance range will engage the outer member 2 with only the primary sealing surface 20, as shown in FIG. 5, whereas a seal 10 formed on the diametrically greater end of the tolerance range will engage the outer member 2 with both the primary sealing surface 20 and a portion of the secondary sealing surface 22 (not shown).

Referring to FIGS. 3-7, in certain applications, the seal annular body 12 preferably includes both a body axial section 30 and a body radial section 32, and may include additional axial and/or radial sections (none shown). The body axial section 30 provides the first and second circumferential surfaces 14, 16 and the body radial section 32 extends from one of the first and second circumferential surfaces 14 or 16 and is integrally connected with the axial section 30 so as to form a juncture 34. Preferably, the sealing projection 18 extends from the first circumferential surface 14 adjacent to the juncture 34, but may alternatively be located centrally or otherwise spaced from the juncture 34 (structure not shown).

Further, the second circumferential surface 16 of the seal body 12 is preferably bonded to either the outer member inner surface 2a or the inner member outer surface 1a, as well as bonding the radial surface 36 of the section 32 to a radial surface (not indicated) of the coupled body 1 or 2 when the seal body 12 includes the radial section 32. However, the seal body 12 may be coupled with the member 1 or 2 by any appropriate means, such as fasteners, friction, etc. Furthermore, as mentioned above, the seal body 12 may alternatively be formed as a substantially annular ring (not shown) without a radial section, and sized to be installed within a groove of the inner member 1 or a groove in the outer member 2 (neither structure depicted).

Figure 8:
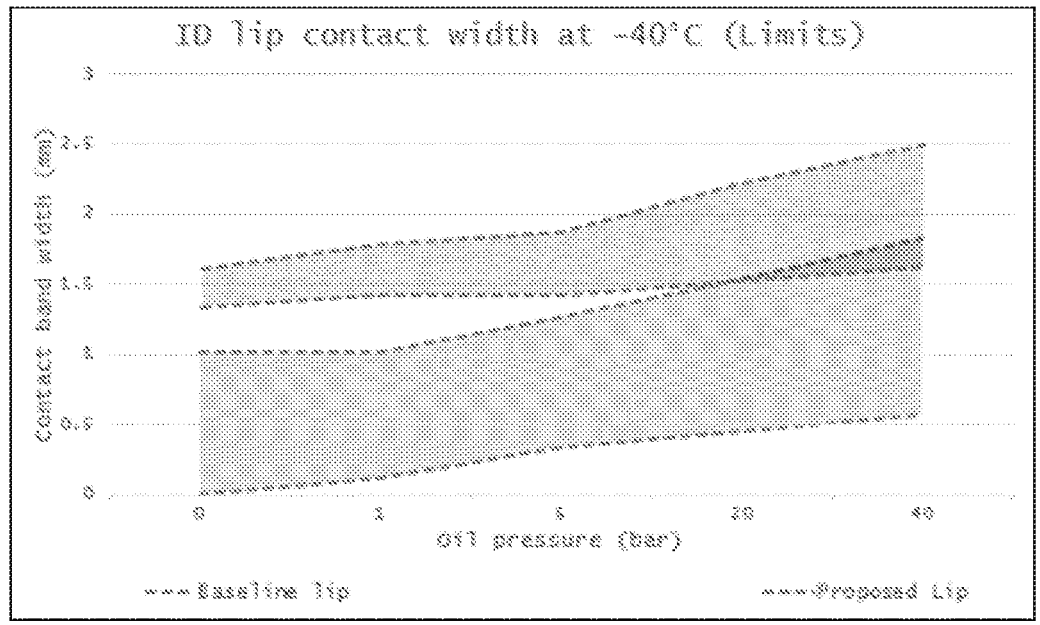
FIG. 8 is a chart comparing the width of the contact band of the present seal to the width of the contact band of a prior art seal at various pressures.
Figure 9:
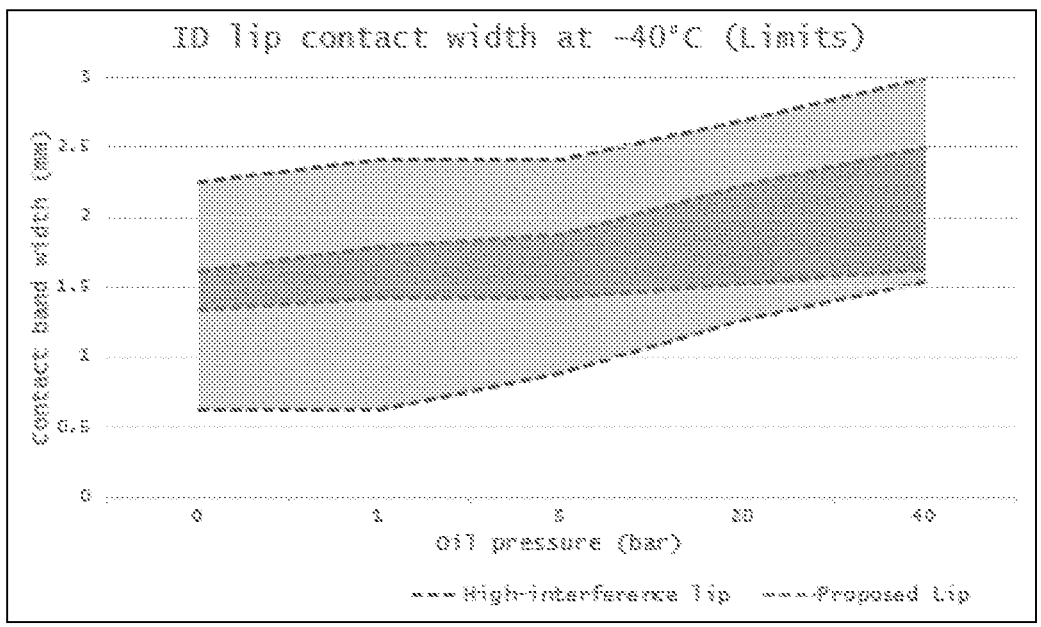
FIG. 9 is a chart comparing the width of the contact band of the present seal to the width of the contact band of a prior art seal with increased lip interference at various pressures.

The benefits of the present invention are readily apparent from a comparison with previously known seal designs, as shown in FIGS. 8 and 9. First, FIG. 8 is a comparison of the present seal 10 with a previously known seal having a standard semicircular lip.

Clearly, FIG. 8 shows that the seal 10 has a substantially greater contact band over a range of fluid pressures in comparison with a standard lip operating with a normal radial loading, and in particular, a much greater minimum contact band width over a range of manufacturing tolerances.

Next, FIG. 9 is a comparison of the present seal with a previously known seal with substantially increased lip interference.

As shown in FIGS. 8 and 9, the present seal 10 has a greater minimum contact band over a range of manufacturing tolerances and a narrower band of contact widths, providing more consistent performance over the tolerance range.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A seal for sealing an annular space between an inner member and an outer member, the inner member having an outer circumferential surface and the outer member having an inner circumferential surface, the annular space being defined between the inner and outer circumferential surfaces, one of the inner and outer members being displaceable through a stroke length along a central axis, the seal comprising:

an annular seal body formed of an elastomeric material, coupled with the inner member or with the outer member, and having a first circumferential surface, an opposing second circumferential surface, and a sealing projection extending radially from the first circumferential surface, the projection having a frustoconical primary sealing surface with a first axial end, a second axial end and a linear axial length between the first and second ends, the axial length of the primary sealing surface having a value of at least about a value of the entire stroke length, and a secondary sealing surface extending radially and axially between the primary sealing surface and the first circumferential surface, the primary sealing surface defining a first angle with respect to the central axis or a line parallel with the axis and the secondary sealing surface defining a second angle with respect to the central axis or the line parallel with the axis when the projection is in a nonengaged state, the second angle having a value greater than the first angle, wherein one of:

the projection is formed as a cantilever extending axially beyond an axial end of the inner member and is sealingly engageable with the inner surface of the outer member when the seal body is coupled with the inner member such that substantially the entire axial length of the primary sealing surface is always disposed against the inner surface of the outer member; and the projection is formed as a cantilever extending axially beyond an axial end of the outer member and is sealingly engageable with the outer surface of the inner member when the seal body is coupled with the outer member such that substantially the entire axial length of the primary sealing surface is always disposed against the outer surface of the inner member.

2. The seal as recited in claim 1 wherein the first angle has a value of less than seven and one-half degrees (7.5°) when the projection is in a nonengaged state.

3. The seal as recited in claim 2 wherein the value of the first angle is less than five degrees (5°) when the projection is in a nonengaged state.

4. The seal as recited in claim 1 wherein the primary sealing surface has a diameter about the central axis, the diameter varying at least substantially linearly between the first axial end of the sealing surface and the second axial end of the sealing surface.

5. The seal as recited in claim 1 wherein a portion of the secondary sealing surface is disposed against the one of the inner member outer surface or the outer member inner surface when the annular space has a radial length of less than a predetermined value.

6. The seal as recited in claim 1 wherein the annular body includes a body axial section providing the first and second circumferential surfaces and a body radial section extending from one of the first and second circumferential surfaces and integrally connected with the axial section so as to form a juncture, the sealing projection extending from the first circumferential surface adjacent to the juncture.

7. A seal for sealing an annular space between an inner member and an outer member, the inner member having an outer circumferential surface and the outer member having an inner circumferential surface and an axial end, the annular space being defined between the inner and outer circumferential surfaces, one of the inner and outer members being linearly displaceable through a stroke length along a central axis, the seal comprising:

an annular seal body formed of an elastomeric material and having an inner circumferential surface and an opposing outer circumferential surface, the outer circumferential surface being disposed on the inner surface of the outer member, and a generally cantilever-like sealing projection extending radially inwardly from the inner circumferential surface and axially beyond the axial end of the outer member, the projection having a frustoconical primary sealing surface having a first axial end, a second axial end and a linear axial length between the first and second ends, the axial length of the primary sealing surface having a value of at least about a value of the entire stroke length, and a secondary sealing surface extending radially and axially between the primary sealing surface and the inner circumferential surface, the primary sealing surface defining a first angle with respect to the central axis or a line parallel with the central axis and the secondary sealing surface defining a second angle with respect to the central axis or the line parallel with the central axis when the projection is in a nonengaged state, the second angle having a value greater than the first angle, the projection being sealingly engageable with the outer surface of the inner member such that substantially the entire axial length of the primary sealing surface is always disposed against the outer circumferential surface of the inner member when the seal is installed and operational.

8. The seal as recited in claim 7 wherein the first angle has a value of less than seven and one-half degrees (7.50) when the projection is in a nonengaged state.

9. The seal as recited in claim 8 wherein the value of the first angle is less than five degrees (5°) when the projection is in a nonengaged state.

10. The seal as recited in claim 7 wherein the sealing surface has a diameter about the central axis, the diameter varying at least substantially linearly between the first axial end of the sealing surface and the second axial end of the sealing surface.

11. The seal as recited in claim 7 wherein a portion of the secondary sealing surface is disposed against the outer surface of the inner member when the annular space has a radial length of less than a predetermined value.

12. A seal for sealing an annular space between an inner member and an outer member, the inner member having an outer circumferential surface and an axial end and the outer member having an inner circumferential surface, the annular space being defined between the inner and outer circumferential surfaces, one of the inner and outer members being linearly displaceable through a stroke length along a central axis, the seal comprising:

an annular seal body formed of an elastomeric material and having an inner circumferential surface and an opposing outer circumferential surface, the inner circumferential surface being disposed on the outer surface of the inner member, and a generally cantilever-like sealing projection extending radially outwardly from the outer circumferential surface of the seal body and axially beyond the axial end of the inner member, the projection having a frustoconical primary sealing surface having a first axial end, a second axial end and a linear axial length between the first and second ends, the axial length of the primary sealing surface having a value of at least about a value of the entire stroke length, and a secondary sealing surface extending radially and axially between the primary sealing surface and the outer circumferential surface, the primary sealing surface defining a first angle with respect to the central axis or a line parallel with the central axis and the secondary sealing surface defining a second angle with respect to the central axis or the line parallel with the central axis when the projection is in a nonengaged state, the second angle having a value greater than the first angle, the projection being sealingly engageable with the inner surface of the outer member such that substantially the entire axial length of the primary sealing surface is always disposed against the inner circumferential surface of the outer member when the seal is installed and operational.

13. The seal as recited in claim 12 wherein the first angle has a value of less than seven and one-half degrees (7.50) when the projection is in a nonengaged state.

14. The seal as recited in claim 13 wherein the value of the first angle is less than five degrees (5°) when the projection is in a nonengaged state.

15. The seal as recited in claim 12 wherein the sealing surface has a diameter about the central axis, the diameter varying at least substantially linearly between the first axial end of the sealing surface and the second axial end of the sealing surface.

16. The seal as recited in claim 12 wherein a portion of the secondary sealing surface is disposed against the inner surface of the outer member when the annular space has a radial length of less than a predetermined value.

* * * * *